United States Patent [19]

Bergandy

[11] Patent Number: 4,593,720
[45] Date of Patent: Jun. 10, 1986

[54] FILLING NOZZLE VALVE STRUCTURE

[75] Inventor: Wieslaw Bergandy, Arnold, Md.

[73] Assignee: National Instrument Company, Inc., Baltimore, Md.

[21] Appl. No.: 563,456

[22] Filed: Dec. 20, 1983

[51] Int. Cl.[4] .............................................. F16K 15/14
[52] U.S. Cl. ...................................... 137/859; 137/496
[58] Field of Search ........... 137/496, 508, 859, 512.15, 137/516.15

[56] References Cited

U.S. PATENT DOCUMENTS

| 236,719 | 1/1881 | Renton | 137/496 |
|---|---|---|---|
| 2,426,040 | 8/1947 | Miller | 137/496 |
| 3,160,329 | 12/1964 | Radic | 137/859 X |
| 3,176,712 | 4/1965 | Ramsden | 137/496 |
| 3,406,910 | 10/1968 | Simmons | 137/859 X |
| 3,850,190 | 11/1974 | Carlson | 137/859 X |

FOREIGN PATENT DOCUMENTS

| 806301 | 6/1951 | Fed. Rep. of Germany | 137/859 |
|---|---|---|---|
| 2052018 | 1/1981 | United Kingdom | 137/859 |
| 2077397 | 12/1981 | United Kingdom | 137/859 |

Primary Examiner—Robert G. Nilson
Attorney, Agent, or Firm—Craig & Burns

[57] ABSTRACT

A filling nozzle valve structure, with a first housing member provided with a chamber-like recess terminating in an outlet bore, an annular diaphragm member in the bottom of the recess, a valving member operable to engage with the diaphragm, and a second housing member operable to be screwed together with said first housing member and holding said valving member in place within the recess; the valving member is provided with a central bore extending therethrough and with two annular diaphragm-engaging surfaces spaced in the radial direction and leaving therebetween discharge bores in communication with the central bore; the outer annular surface thereby engages with the outer area of the annular diaphragm member so as to prestress the same in the flow direction to thereby cause the inner area of the annular diaphragm to deflect in the opposite direction and thereby engage with the inner annular surface of the valving member whereby the valve structure is closed; a predetermined pressure on the diaphragm will cause disengagement of the inner annular diaphragm area from the inner surface of the valving member to open the valve structure.

17 Claims, 3 Drawing Figures

FILLING NOZZLE VALVE STRUCTURE

The present invention relates to a filling nozzle valve structure and more particularly to a filling nozzle valve assembly with suck-back action for piston-type filling units or filling machines.

In filling machines of the type described in the U.S. Pat. Nos. 2,807,213 and 3,237,661, a piston-type filling unit as described, for example, in U.S. Pat. Nos. 2,807,213 and 2,907,614 providing a suction and a discharge stroke, is ordinarily connected with a filling nozzle by way of a hose. In these prior art filling machines, the filling nozzles are lowered into the containers to be filled, the product to be filled is then discharged under pressure during the discharge stroke into the containers, and the nozzles are thereafter raised out of the containers during the next suction stroke. To assure proper operation, a valve assembly is normally used with a respective filling unit which, during the discharge stroke of the filling unit, closes the feed line to the piston pump of the filling unit while opening the discharge line to the filling nozzle, and which during the suction stroke, again closes the discharge line leading to the filling nozzle while opening the feed line to thereby permit a fresh supply of product to be sucked into the piston pump of the filling unit for subsequent discharge thereof during the next power stroke (U.S. Pat. Nos. 2,807,213; 2,978,149 and 4,055,281).

To prevent spillage of small quantities of the product to be filled which may be left behind in the nozzle discharge bore and which otherwise might drop onto the conveyor or onto the outside of the containers after completion of the discharge stroke and after raising of the nozzles out of the containers, so-called suck-back devices have been used heretofore as disclosed, for example, in the U.S. Pat. Nos. 2,978,149 and 3,771,908. Though these prior art suck-back devices proved quite successful, they increase the cost of manufacture of the equipment and also require adjustments.

It is therefore a principal object of the present invention to provide a filling nozzle valve structure which is simple in construction, relatively inexpensive to manufacture, and reliable in operation.

Another object of the present invention resides in a filling nozzle valve structure in which the cracking pressure of the valve can be readily adjusted so as to match the nozzle to the type and size of the pump used in the filling unit.

A further object of the present invention resides in a valve structure for filling nozzles which permits improved cleaning and which is so constructed that all corners and surfaces are readily accessible to the cleaning medium.

A still further object of the present invention resides in a filling nozzle valve structure in which all parts can be made by simple turning.

Valve structures utilizing an elastomer as the valve element are known, as such, in the prior art. For example, the U.S. Pat. No. 2,941,541 to Peras discloses a resilient valve element adapted to open under pressure. However, this particular arrangement does not permit an adjustment of the opening pressure of the valve and would be unsuitable for cleaning in an autoclave as required of such valve structures when used with filling nozzles handling widely varying products.

An air check valve is disclosed in the U.S. Pat. No. 2,580,455 to J. T. Myers which entails the same disadvantages as mentioned hereinabove in connection with the Peras patent. Additionally, the valve element itself is of complicated structure so that the cost of manufacture thereof would be greatly increased.

Another suck-back valve structure is disclosed in U.S. Pat. No. 3,886,974. However, this patent also entails the same disadvantages as the other prior art patents mentioned hereinabove.

The underlying problems are solved according to the present invention in that the valve structure essentially consists of two housing parts that can be readily made by turning which are adapted to be screwed together so as to hold in place the valving member, properly speaking. The valving member, at its downstream end, is provided with a pointed annular engaging surface adapted to engage with the radially outer area of an annular diaphragm seal having a central hole. The valving member is thereby displaced in the direction toward the annular seal as the two housing parts are screwed together more tightly so that the prestress acting on the annular diaphragm seal member can be adjusted. As a result of the prestress applied by the annular engaging surface of the valving structure on the diaphragm seal, the latter will deform by deflection of the inner annular area thereof so as to close the through-flow passages and will open only under a pressure of the product to be supplied which overcomes the prestress.

Additionally, by unscrewing the two housing parts a predetermined distance, the valving member can be retracted so as to enable facilitated cleaning, especially around all surfaces of the elastomer of the diaphragm seal.

These and other objects, features and advantages of the present invention will become more apparent from the following description when taken in connection with the accompanying drawing which shows, for purposes of illustration only, one embodiment in accordance with the present invention, and wherein.

Figure 1:
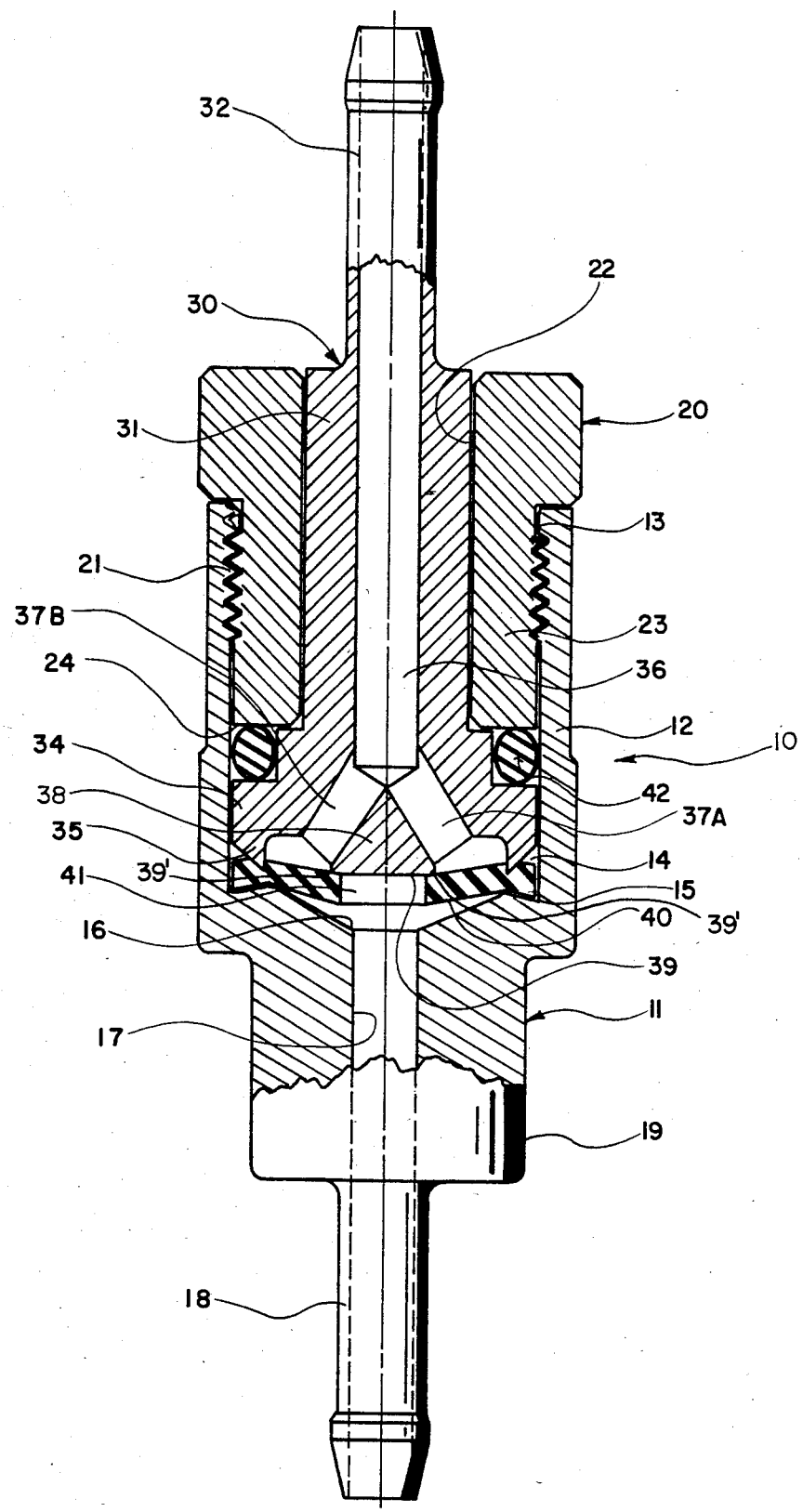
FIG. 1 is an elevational view, partly broken away, of a filling nozzle valve structure in accordance with the present invention.

Referring now to the drawing wherein like reference numerals are used throughout the various views to designate like parts, and more particularly to FIG. 1, the valve structure generally designated by reference numeral 10 for a filling nozzle of the type described above consists of a two-partite housing assembly consisting of a female housing member generally designated by reference numeral 11 and of a male housing member generally designated by reference numeral 20 which are adapted to be screwed together by means of the respective internal threads 13 and the external threads 21. The female housing member 11 consists of a sleeve-like housing portion 12 provided with the internal threads 13 and forming an annular chamber-like recess 14 which includes at the bottom thereof an annular undercut area 15 which is adjoined radially inwardly thereof by bevelled surfaces 16 forming a funnel-like inlet which connects with a central bore 17. The central bore 17 thereby extends from the funnel-shaped inlet 16 through the stepped housing portion 19 into the connecting nipple portion 18.

The male housing member 20 includes a sleeve-like portion 23 provided with the external threads 21 and with an internal central bore 22 extending over the entire length of the male housing member 20.

Figure 2:
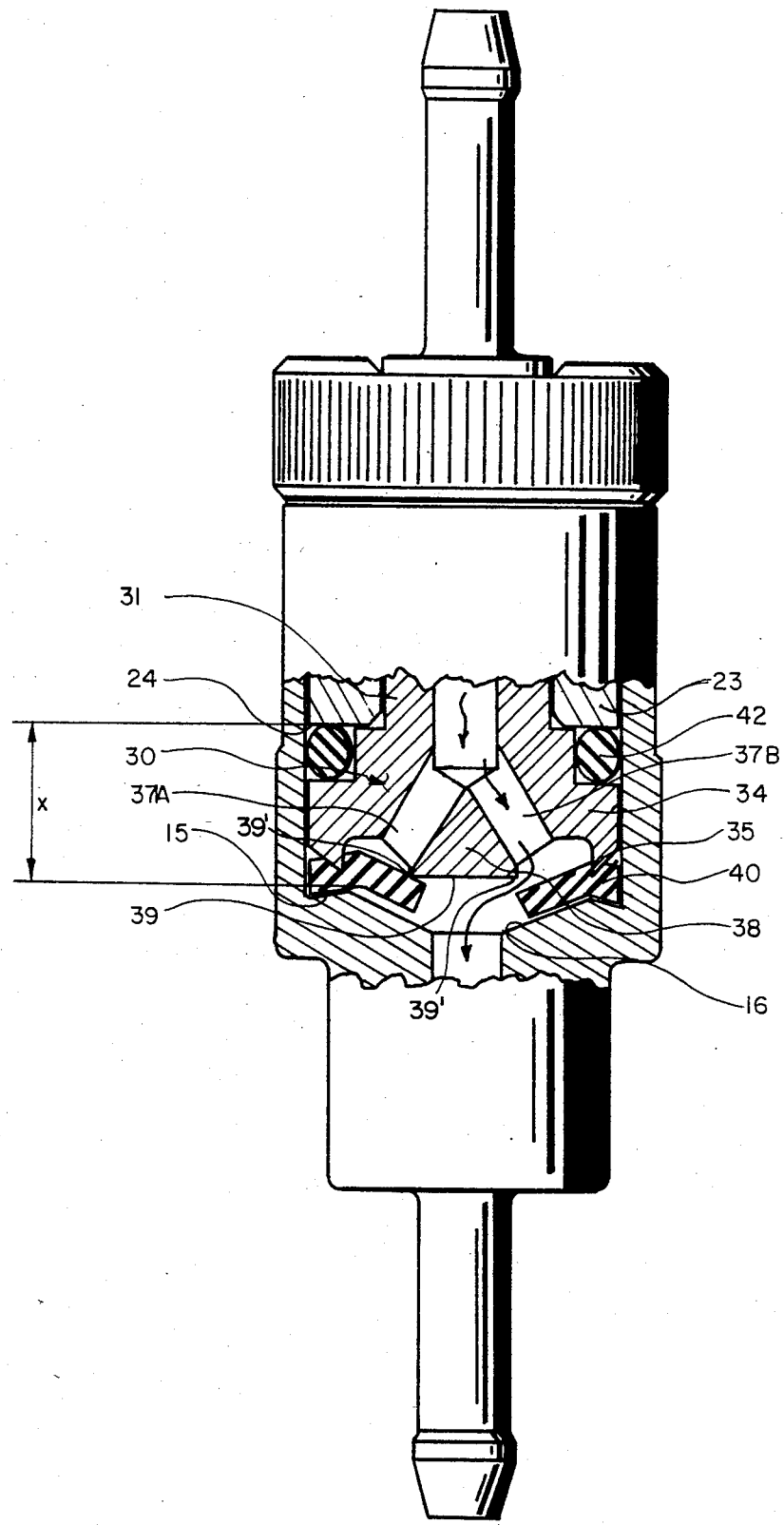
FIG. 2 is a somewhat schematic partial view of the filling nozzle valve structure of FIG. 1, showing in the left half the valve under no-flow condition and in the right half the valve under flow condition.
Figure 3:
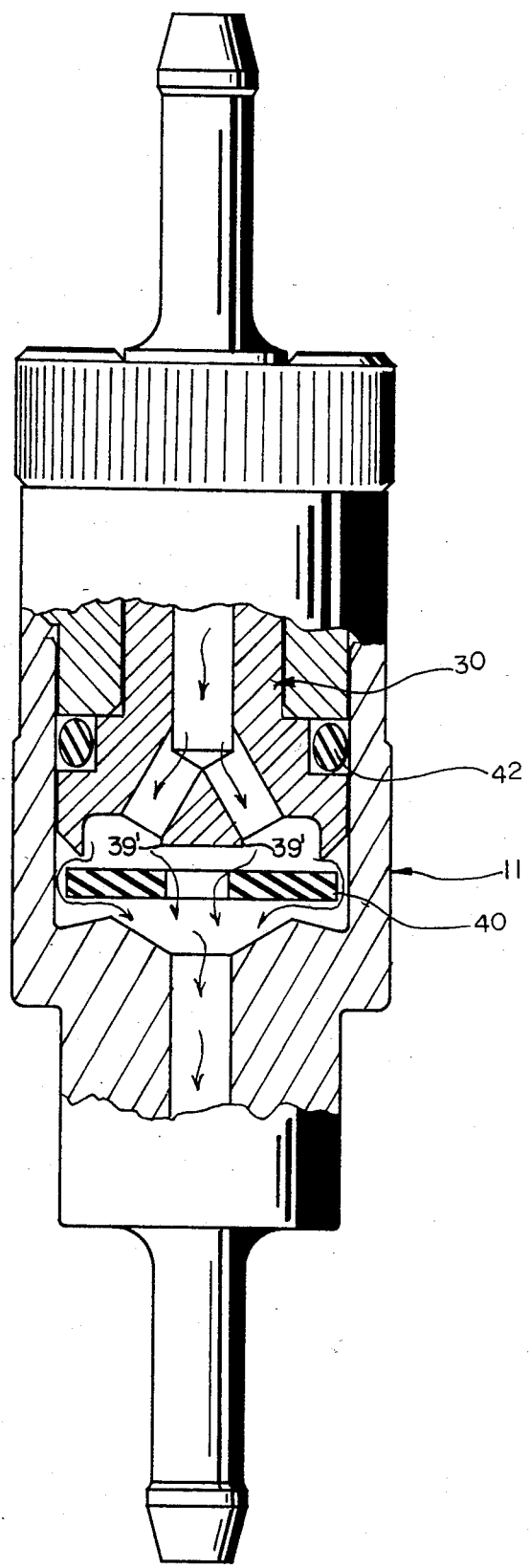
FIG. 3 is a partial schematic view of the valve structure of FIG. 1, illustrating the parts thereof in the cleaning condition.

A valving member generally designated by reference numeral 30 includes a main valve body portion 31 of external dimensions complementary to the internal bore 22, of a connecting nipple portion 32 on the top, as viewed in FIG. 1, and of radially stepped portions 33 and 34 increasing in diametric dimensions toward the bottom thereof, as viewed in FIG. 1, whereby the stepped portion 33 has a radial dimension less than half the diameter of the recess 14 and passes over by way of a shoulder surface into the stepped portion 34. The stepped portion terminates in a pointed annular engaging surface 35 adapted to engage with the outer area of an annular diaphragm member 40 forming a seal. The valving member 30 is provided with a central bore 36 extending from the top end of the connecting nipple portion 32 over almost the entire length thereof and branches off into branch bores 37a and 37b as shown in the drawing, leaving therebetween a wedge-shaped end portion 38 whose short cylindrical extension 39 forms an annular edge 39' adapted to engage with the radially inner area of the diaphragm member 40 that may be made of any suitable material (FIGS. 2 and 3). The annular diaphragm member 40 is provided with a central hole 41 of a diameter smaller than the diameter of the cylindrical extension 39 and located in front thereof. O-rings 42 are accommodated in the annular space formed between the end face 24 of the sleeve-like portion 23 of the male housing member 20 and the axial and radial surfaces formed by the stepped portions 33 and 34.

The valve structure in accordance with the present invention can be assembled in a simple manner. It is only necessary to insert the diaphragm member 40 into the bottom of the chamber-like recess 14, to thereupon axially insert the valve member 30, with the O-ring 42 already placed on the stepped portion 33 and thereafter screw the housing member 20 into the housing member 11.

The normal, closed condition of the assembled valve structure is shown in the left half of FIG. 2. Owing to the prestress resulting from the engagement of the pointed annular engaging surface 35 of the valving member 30 with the radially outer area of the annular diaphragm member 40, the latter is prestressed due to its deflection into the undercut area 15 which in turn causes the diaphragm member 40 to abut with its radially inner area against the annular edge 39' of the cylindrical extension 39. The force with which the diaphragm member 40 abuts against the annular edge 39' depends on the force with which the two housing parts 11 and 20 are screwed together so that the opening pressure at which the valve will open can be readily adjusted thereby.

The right half of FIG. 2 illustrates the valve structure in the open condition when product to be filled into the containers is supplied under pressure by a filling unit (not shown). By changing the distance "x" (FIG. 2) between the end face 24 of the sleeve-like portion 23 of the male housing member 20 and the intersection between the surfaces forming the undercut 15 and the funnel-shaped inlet 16, the initial prestress of the elastomeric diaphragm member 40 can be changed so that the cracking pressure of the valve can also be readily adjusted. Additionally, higher opening pressures can also be realized by using thicker or different elastomeric materials. A safe seal is provided by the engagement of the pointed annular surface 35 of the valve member 30 with the diaphragm member 40, which remains preserved, even when the valve opens so that the O-ring 42 never comes into contact with the product.

Cleaning of the valve assembly and in particular around all surfaces of the diaphragm member 40 is made possible by merely unscrewing the two housing members 11 and 20 to retract the valve member 30 away from the diaphragm member 40 as shown in FIG. 3. A suitable cleaning medium heated to high temperatures can then flow around all surfaces of the diaphragm member 40 as indicated by the arrows to clean the same completely, which is particularly important when changing the product. The O-rings 42 provide a seal from the outside during the cleaning operation of the valve.

It will be readily appreciated that all the parts used in the valve assembly of the present invention can be made in a relatively inexpensive manner by turning. Additionally, the cracking pressure of the valve can be readily adjusted by the force with which the parts 11 and 12 are screwed together and/or by the thickness and material used for the diaphragm 40. The present invention not only permits to control the bypass pressure which was virtually impossible heretofore, and especially with low pressure filling compounds permits calibration of the amount to be filled by each nozzle in connection with multi-pump filling units. Additionally, a variety of elastomers or similar materials may be used in connection with the diaphragm member 40 which can be chosen to be compatible with the product to be filled. Autoclaving at temperatures of 250° F. would thus be readily possible with the filling nozzle valve structure according to the present invention.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A filling nozzle valve structure having a flow direction, comprising a first housing member provided with a chamber-like recess terminating in an outlet bore, annular diaphragm means in said recess provided with a central hole, valving means in said recess and operable to engage with said diaphram means, and a second housing member having a central bore and operable to be screwed together with said first housing member and to hold said valving means in place within said recess, said valving means being provided with a central inlet bore for a product to be filled, characterized in that said valving means is provided at its end in the chamber-like recess with two radially spaced annular diaphragm-engaging surface means leaving therebetween an area provided with discharge bore means in communication with said inlet bore, one of said surface means which is located radially outwardly of the other surface means, being operable to engage with the radially outer area of the annular diaphragm means so as to prestress the radially outer area in the flow direction about a fulcrum area located intermediate the two surface means to thereby cause the radially inner area of the annular diaphragm means to be stressed in a direction opposite said flow direction so as to engage with the outer surface means and to thereby hold the valve structure in closed condition by said prestress while enabling opening of the valve structure in the presence of a product under predetermined pressure causing disengagement of the inner annular area of the diaphragm means from the second surface means.

2. A filling nozzle valve structure according to claim 1, wherein at least two discharge bore means are provided leaving therebetween a short cylindrical extension forming an annular edge constituting said other diaphragm-engaging surface means.

3. A filling nozzle valve structure according to claim 1, wherein said radially outer diaphragm-engaging surface means are formed by a pointed annular surface in the radially outer part of the valve means.

4. A filling nozzle valve structure according to claim 3, characterized in that the bottom of said recess is undercut in the radially outer area thereof to enable deflection of the annular diaphragm means during prestressing.

5. A filling nozzle valve structure according to claim 4, wherein the undercut portion is adjoined centrally thereof by a funnel-shaped inlet portion in communication with the bore in the first housing member.

6. A filling nozzle valve structure according to claim 5, wherein the cracking pressure of the valve structure can be adjusted by the prestress exerted on the diaphragm means by the first diaphragm-engaging surface means which depends on the force with which the first and second housing members are screwed together.

7. A filling nozzle valve structure according to claim 6, wherein the cracking pressure of the valve structure can be adjusted by selection of the thickness of the diaphragm means.

8. A filling nozzle valve structure according to claim 7, in which all parts can be made by simple turning.

9. A filling nozzle valve structure according to claim 8, wherein said diaphragm means is a flat elastomer diaphragm provided with a central hole.

10. A filling nozzle valve structure according to claim 9, characterized in that said valving means has two stepped portions near its discharge end thereof cooperating with the end face of the second housing member to form a space accommodating an O-ring for sealing the system with respect to the outside.

11. A filling nozzle valve structure according to claim 1, characterized in that the bottom of said recess is undercut in the radially outer area thereof to enable deflection of the annular diaphragm means during prestressing.

12. A filling nozzle valve structure according to claim 11, wherein the undercut portion is adjoined centrally thereof by a funnel-shaped inlet portion in communication with the bore in the first housing member.

13. A filling nozzle valve structure according to claim 1, wherein the cracking pressure of the valve structure can be adjusted by the prestress exerted on the diaphragm means by the first diaphragm-engaging surface means which depends on the force with which the first and second housing members are screwed together.

14. A filling nozzle valve structure according to claim 1, wherein the cracking pressure of the valve structure can be adjusted by selection of the thickness of the diaphragm means.

15. A filling nozzle valve structure according to claim 14, wherein said diaphragm means is a flat elastomer diaphragm provided with a central hole.

16. A filling nozzle valve structure according to claim 1, characterized in that said valving means has two stepped portions near its discharge end thereof cooperating with the end face of the second housing member to form a space accommodating an O-ring for sealing the system with respect to the outside.

17. A filling nozzle valve structure having a flow direction which consists only of four parts, namely of a first housing member, of a flat diaphragm means, of a valving means and of a second housing member, and means threadably connecting said second housing member with said first housing member, said second housing member and said valve means having means to assist in prestressing of an outer area of said diaphragm in the flow direction and a radially inwardly area of the diaphragm opposite the flow direction for normal operation while being readily adjustable in its cracking pressure by the degree of threaded connection yet permitting the valve structure to be cleaned in all parts coming in contact with the product to be filled including all surfaces of the diaphragm means when the threaded connection is loosened.

* * * * *